US008577764B2

(12) United States Patent
Weigman et al.

(10) Patent No.: US 8,577,764 B2
(45) Date of Patent: Nov. 5, 2013

(54) GOAL INSURANCE

(75) Inventors: Scott A. Weigman, Charlotte, NC (US); Georgiana L. Gormley, Durham, NC (US); Timothy J. Bendel, Charlotte, NC (US); Melanie Lynn Alexander, Davidson, NC (US); Manoj Govindan, Gastonia, NC (US); Todd J. Worrall, Landenberg, PA (US); Deborah F. Wire, Amston, CT (US)

(73) Assignee: Bank of America Corporation, Charlotte, NC (US)

( * ) Notice: Subject to any disclaimer, the term of this patent is extended or adjusted under 35 U.S.C. 154(b) by 636 days.

(21) Appl. No.: 12/494,836

(22) Filed: Jun. 30, 2009

(65) Prior Publication Data
US 2010/0332243 A1   Dec. 30, 2010

(51) Int. Cl.
*G06Q 40/00*   (2012.01)

(52) U.S. Cl.
USPC ............................................. 705/35; 705/40

(58) Field of Classification Search
USPC ................................................ 705/4, 35, 40
See application file for complete search history.

(56) References Cited

U.S. PATENT DOCUMENTS

2007/0136105 A1* 6/2007 Huberman et al. ............... 705/4
2008/0288277 A1* 11/2008 Fasciano ........................... 705/1

OTHER PUBLICATIONS

Hutton, Todd Stewart; "Historical-Sociological Analysis of Goal Transformation in a Social movement . . . "; Duke University Ph.D. Paper; 1982.*
Per, Allan Stanley; "A case study into the process of Goal Alteration"; Temple University Ph.D. Paper; 1982.*

* cited by examiner

*Primary Examiner* — Edward Chang
(74) *Attorney, Agent, or Firm* — Banner & Witcoff, Ltd; Michael A. Springs

(57) ABSTRACT

Goal insurance is provided as a purchasable option to users who wish to have a goal tracking system monitor and enforce their goals. The user may define the goal, a reward to be given upon successful completion of the goal and penalties to be applied if the goal is not met. To avoid penalties, the user may purchase goal insurance that may be used or apply under specified circumstances. Such circumstances may include death, illness, unemployment or the like. Goal information and progress may be monitored by the goal tracking system and may further be published to one or more sites. Other users may contribute to the user's reward or send encouraging remarks. If the user does not purchase goal insurance, the predefined penalties may be applied upon expiration of a goal time period if the user has not achieved their goal.

24 Claims, 5 Drawing Sheets

GOAL SETUP

300

305

Goal Type: Weight loss ▽ — 310
Goal Amount: 20 lbs. — 315
Timeline: 8 weeks ▽ — 320, 325

330

Reward Type: Money ▽ — 335
Goal Amount: $ 500.00 — 340

Funding Source Type: EFT ▽ — 345
Bank Account No.: XXXXXX — 350
Routing No.: XXXXXX — 355

360

Negative Consequence Type: Distribute Reward ▽ — 365
Name: 380
Address: 385
E-mail: 390
Amount: 375

370

391

Purchase Insurance? Yes ▽ — 393
Available Insurance: — 397
● Coverage #1  details
○ Coverage #2  details
○ Coverage #3  details

395

DEFAULT — 303  CLEAR — 399  SUBMIT — 398

*FIG. 3*

GOAL INSURANCE

TECHNICAL FIELD

Aspects of the present disclosure relate to establishing and reaching a goal. More specifically, aspects relate to providing insurance for an entity in the event a goal is not achieved by the entity.

BACKGROUND

Goals provide a way for individuals or organizations to specifically define and solidify plans that the person or organization wishes to achieve. Goals may include saving money, losing weight, generating business and the like. Without proper motivation and enforcement, however, goals are often forgotten or set aside for a later date. In some cases, goals may be written down or entered into a system that helps the goal setter stay on track. However, individuals or organizations may be hesitant to use such methods or systems in fear of not achieving their goal and having to suffer negative or other consequences because of circumstances that may be beyond their control such as unemployment or health related issues. Accordingly, would-be goal setters may relegate themselves to never achieving or even trying to achieve their goals.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

One or more aspects described herein provide automated goal monitoring, tracking, rewarding, issuing negative consequences and insuring of user defined goals. For example, a user may specify a goal he or she would like to achieve and define a reward and a negative consequence associated therewith. The reward may be funded by the user, by a financial institution, supporters and/or combinations thereof. Examples of negative consequences include the forfeiture of the reward, distribution of reward to individuals or entities other than the user (e.g., charities, relatives and others) and the like. The user may also, in one or more arrangements, be allowed to purchase goal insurance. Goal insurance provides the user with protection against application of the negative consequence if the user fails to achieve his or her goal due to some predefined circumstance. If insurance applies, the user may be refunded the user's own funds or other contributions to the reward. Other donors or contributors to the reward may also have their contributions or donations returned.

According to another aspect, goal information may be published for a community or the general public to view and monitor. In one arrangement, the goal information may be published as a goal tracker on a website associated with a goal tracking system with which the goal is created and enforced. Alternatively or additionally, the goal information may be published as a goal tracker on a social or community networking site separate from the goal tracking system. For example, a user may publish a goal tracking applet on his or her social networking page.

BRIEF DESCRIPTION OF THE DRAWINGS

The present disclosure is illustrated by way of example and not limited in the accompanying figures in which like reference numerals indicate similar elements.

FIG. 3 illustrates an example goal definition interface according to one or more aspects described herein.

DETAILED DESCRIPTION

In accordance with various aspects of the disclosure, systems and methods are illustrated for providing goal setting, tracking and insurance. These goals may include personal physical goals, financial goals, and the like. A financial system may provide or allow a user to define incentives for reaching a specified goal. For example, a user may specify a desired reward for accomplishing a goal such as an amount of weight lost, a distance run, an amount of money saved and the like. The financial system may also provide further motivation by applying a negative consequence should the user fail to meet his or her goal. A user may further purchase goal insurance in order to avoid the application of negative consequences in certain circumstances such as sickness, unemployment and the like.

Figure 1:
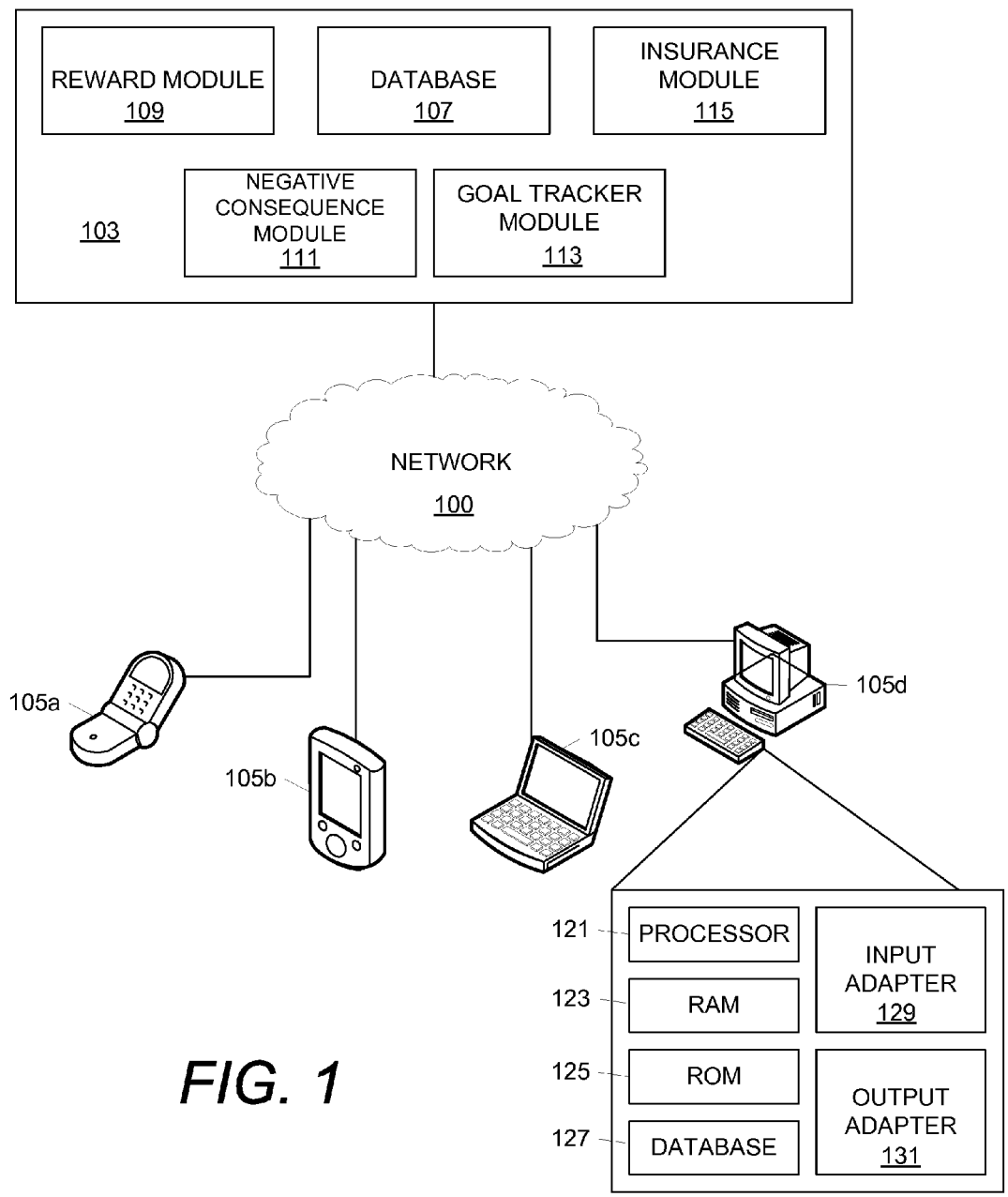
FIG. 1 illustrates an example of a suitable operating environment in which various aspects of the disclosure may be implemented.

FIG. 1 illustrates an example of a suitable operating environment in which various aspects of the disclosure may be used. Goal information may be transmitted between a client device such as one or more of devices 105 and a goal tracking system at a financial institution such as server 103 through network 100. Network 100 may include one or more network systems such as cellular networks, wide area networks (e.g., the Internet), local area network (LANs) and/or combinations thereof. Various communication protocols may also be supported through network 100. Client devices 105 may include portable communication devices such as mobile telephone 105*a*, personal data assistant 105*b* and laptop computer 105*c*, as well as stationary computing devices such as personal computer 105*d*. Using devices 105, a user may define goal parameters at financial server 103 to have the financial institution facilitate the goal tracking and enforcement process.

Financial server 103 includes goal tracking and enforcement components such as goal database 107 configured to store goal parameters and user information. Goal parameters may include the specified goal (e.g., a savings amount), a goal timeframe, a reward, a source of the reward (e.g., a bank account), a penalty and the like. User information may include a name of the user to which the goal applies, contact information, security passcodes or questions and the like. Reward module 109 is configured to collect or otherwise secure the reward that is to be provided upon successful completion of the goal. For example, reward module 109 may be configured to withdraw $1000 a week for 5 weeks from the user's bank account to provide a reward of $5000. In another example, reward module 109 may be configured to purchase a reward item such as a digital camera or watch. Alternatively or additionally, reward module 109 may receive contributions from family members or other supporters of the user. Reward module 109 may also provide interest from the financial institution as an added incentive to reach the user's goal.

Negative consequence module 111, on the other hand, is configured to determine, apply and enforce negative consequences in the event the user fails to meet his or her goal. In one example, a negative consequence may include the distribution of reward money to recipients other than the user (e.g., a charity, a family member and others). Reward module 109 and negative consequence module 111 operate in conjunction with goal tracker module 113 that is configured to determine whether a user is on pace to meet a goal and whether the user has met the goal at the goal deadline. Goal tracker module 113 may provide the user with status updates to insure that the user is aware of a current amount of progress he or she has made toward reaching the goal. This information may help motivate the user and help the user plan use of the remaining time before the goal deadline. In some arrangements, goal tracker module 113 may further be configured to verify progress made. For example, if a user's goal is to lose 20 lbs., goal tracker may be configured to verify weight information by requiring that the user have his or her weight measured at a verified location and reported by a trustworthy source.

Goal insurance module 115 is configured to determine whether the user has purchased goal insurance and whether a failure to meet a goal is covered by the insurance conditions. In particular, insurance might only apply under certain conditions such as if the user became unemployed or sick during the period of time allotted to the user for reaching the goal. Verification may be required prior to applying insurance terms for a user's failure to meet his or her goal. In one example, goal insurance module 115 may be configured to return a user's contributions to a reward payment to the user in the event the user's failure to meet his or her goal qualifies under the purchased insurance. Goal insurance module 115 may operate in conjunction with negative consequence module 111 to insure that the user and user's potential reward is treated in the appropriate manner.

A client device such as device 105*d* may include various computing components and devices including a processor 121, random access memory (RAM) 123, read-only memory (ROM) 125, a communication interface 126 and a database 127. Database 127 may include a hard disk drive (HDD), optical media such as compact discs (CD-ROM, CD-R, CD+R, and the like), solid state drives (SSD) and the like. Database 127 may be configured to store data including software, firmware, images, documents, audio files and the like. For example, database 127 may store application files that provide instructions for device 105*d* to perform various functions. In such an example, the instructions may be loaded into RAM 123 or ROM 125 for faster access and processing by processor 121. In some configurations, applications or other functions of device 105*d* may use communication interface 126 to transmit or receive data to or from, respectively, one or more remote sources through network 100. For example, a user may transmit goal information to server 103 through communication interface 126 of device 105*d*. Device 105*d* may further include one or more input adapters 129 for connecting user input devices such as mice, keyboards, joysticks and fingerprint readers (not shown). Similarly, device 105*d* may include one or more output adapters 131 for outputting data from device 105*d*. For example, displays, speakers and/or tactile output devices may be connected to output adapter 131.

Figure 2:
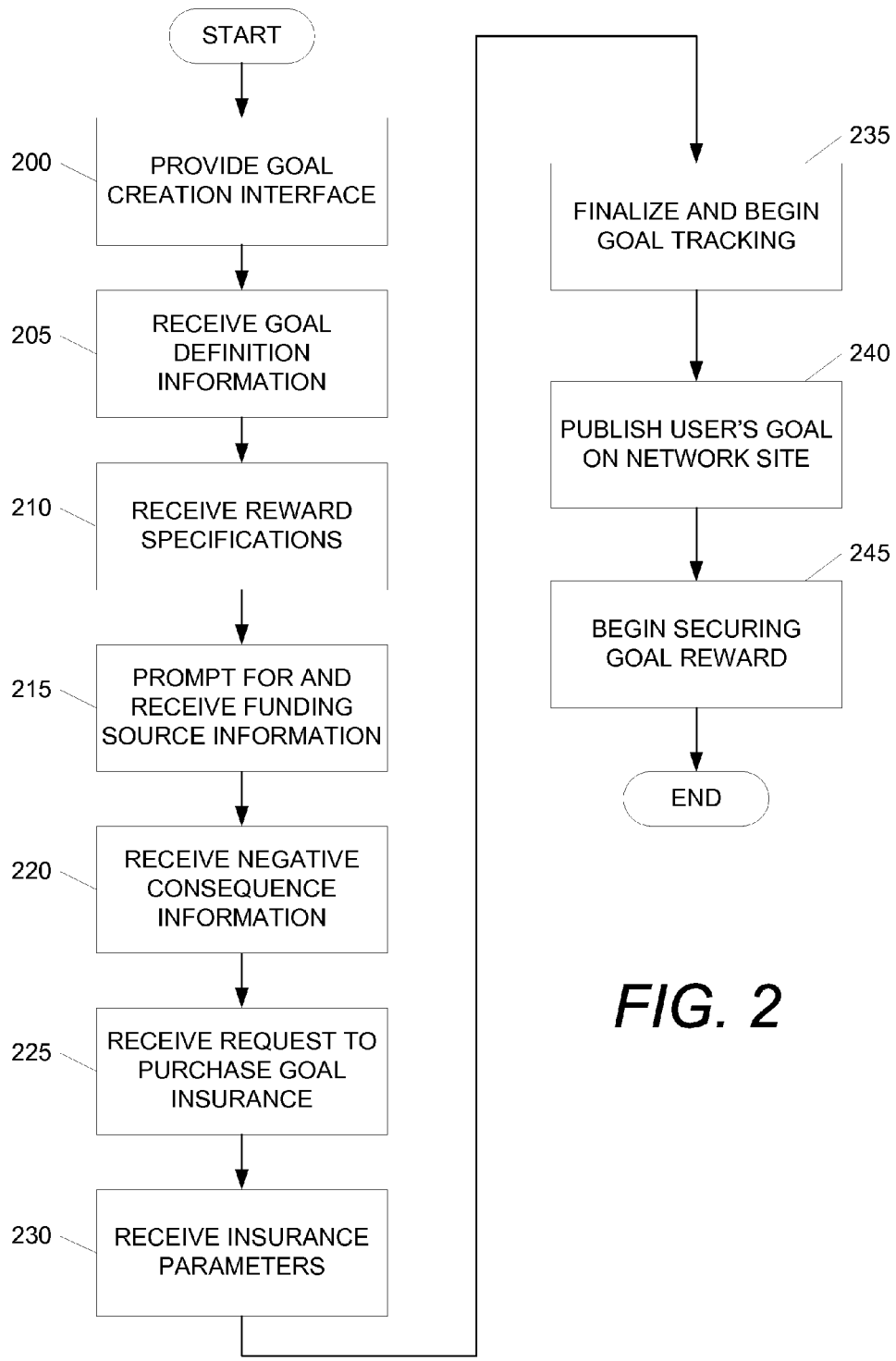
FIG. 2 illustrates an example method for defining and tracking a goal according to one or more aspects described herein.

FIG. 2 illustrates a method by which a user may define and create a goal including reward, negative consequence and insurance parameters with a goal tracking entity (e.g., a financial institution). In step 200, a user is provided with a goal creation interface (as described in further detail below) that allows the user to define aspects of a goal such as the intended goal, reward, negative consequence and insurance. In step 205, a goal tracking system may receive the user's intended goal. The intended goal may include weight loss, a vacation, purchasing a desired item and the like. In step 210, the goal tracking system may receive a desired reward specified by the user. The reward, in one or more arrangements, may be monetary in nature. For example, a user may wish to reward themselves with a specified amount of money or a gift having a specified monetary value. Additionally, in step 215, the goal tracking system may prompt the user for and receive information identifying funding sources for the desired reward. Funding sources may include the user setting the goal, supporters (e.g., family and friends), a financial institution (e.g., providing interest on an amount of the reward) and the like. In one example, the user may specify that the reward is to be withdrawn from his or her bank account.

Once the reward and intended goal have been defined, the goal tracking system may optionally receive information defining a negative consequence in step 220 if the intended goal is not reached. The negative consequence may be enforced if the user fails to meet his or her goal. For example, if a user's goal is to lose 20 lbs. in 8 weeks, but only loses 15 lbs. in that period of time, the negative consequence may be applied. A negative consequence may include distribution of the reward to parties other than the user. Instead of reward the user with $500, for instance, the $500 may be given to a charity, a relative, a friend and/or combinations thereof. Alternatively, the reward, or a portion thereof, may be forfeited to a financial institution providing the goal tracking system. According to one or more arrangements, a negative consequence may be applied or a reward given based on a percentage of the goal achieved. Thus, in the above example, a user may be given 75% of the reward (15 lbs/20 lbs) while the other 25% may be subject to the negative consequence or goal insurance, if applicable.

To avoid application of the negative consequence, the user may choose to purchase goal insurance in step 225. Goal insurance allows the user to avoid the negative consequence under certain circumstances. For example, if the user falls sick, becomes unemployed or incurs some unexpected medical expense, goal insurance may prevent the negative consequence from being applied. In the above example where the reward includes an amount of money funded by the user, if the user fails to achieve his or her goal and qualifies for insurance, the amount of money may be returned to the user. Money donated or provided by other sources may also be returned to those sources if the purchased insurance applies. The circumstances under which goal insurance would apply may be defined by the user (e.g., step 230) or may come prepackaged (i.e., predefined). In one or more arrangements, the broader the coverage of the insurance, the higher the cost. Thus, if a user chooses 10 difference circumstances under which the insurance would be effective, the cost may be higher than if the user only chose 5 qualifying situations. If a user purchases insurance, the goal information may be stored along with a goal insurance indicator identifying the purchase of insurance for that particular goal.

In step 235, the goal tracking system may finalize and begin tracking the goal. Tracking the goal may include receiving data corresponding to user progress toward the goal and performing comparisons between the received progress data and the overall goal parameters. Further, in step 240, the goal tracking system may publish the user's goal on a network site to allow the user to solicit support. In one example, the goal tracking system may provide the user with an applet or other program code (e.g., markup language code) for including a goal monitor on a social networking site. In another example, the goal tracking system may publish a goal tracker on a site affiliated with the goal tracking system or a financial institution system associated with (e.g., providing support for) the user defined goal. In one or more arrangements, publication may depend on whether the user has selected a private or public status for his or her goal. Still further, the goal tracking system may begin securing the specified reward in step 245. For example, the goal tracking system may begin deducting funds from the user's account on a predefined schedule, provide interest from a financial institution where the funds are being held as part of the reward, obtain funds from family, friends and other supporters and the like. If the user has specified a purchasable reward, the goal tracking system, upon securing an amount equal to the cost of the reward, may purchase the reward item.

FIG. 3 illustrates an example user interface through which a user may define goal parameters and initiate monitoring of the goal. Interface 300 includes a goal definition section 305 that allows a user to choose a type of goal from goal menu 310. Goal menu 310 includes choices such as weight loss, savings and item purchase, among others. Upon choosing one of the goals provided in goal menu 310, the user may be presented with an entry field 315 that corresponds to the selected goal. For example, if weight loss is selected, entry field 315 may be assigned a unit of lbs. If, on the other hand, savings is selected, entry field 315 may be assigned a unit of dollars. Additionally, the user may define a timeline for completing the goal in field 320 and menu 325. For example, the user may enter a number in field 320 followed by selection of a unit such as weeks, months, years, days, hours or minutes in menu 325. Alternatively or additionally, the user may specify the timeline by entering a start date and an end date (not shown). According to another aspect, a user may also select a check-in frequency that specifies the number of times a user must check-in with or provide updates to the goal tracking system during the time period set for achieving the goal.

In section 330 of interface 300, a user is provided with a reward definition interface including a reward type menu 335, an amount field 340, and a funding source type 345. Reward type menu 335 provides the user with a list of reward types include money, purchasable items and services. Upon selecting one of the reward types from menu 335, the reward definition interface may change depending on the selected reward type. For example, if the user selects a purchasable item as a reward, the interface may populate with a catalog browsing option (not shown) that allows the user to open, browse and select an item from an item catalog. As illustrated, the reward definition interface includes a selection of money as the reward type. Accordingly, a user my input an amount of money in field 340 as well as specify a source of funds in funding source type 345. Funding source type 345 allows a user to select from a variety of funding source options including electronic funds transfer (EFT), check, credit card, bill me later and the like. In one example, if the user has selected an EFT funding source type, a bank account field 350 and bank routing number field 355 may be displayed.

Section 360 of interface 300 is dedicated to defining a negative consequence that will be applied if the user fails to meet his or her goal within the allotted time frame. Section 360 includes a negative consequence type selection menu 365. The negative consequence type selection menu 365 may include various options including distribute reward to others, donate reward to charity, forfeit reward to financial institution and the like. Because the distribute reward to others negative consequence type has been selected in menu 365, fields 370 for specifying recipients and amount field 375 may be provided. Fields 370 may include a name field 380, address field 385 and contact information field 390. Amount fields 375 are used to specify an amount that the recipient is to receive. Accordingly, a reward, instead of being given to the goal setting user, may be divided among many other recipients.

Interface 300 further includes a goal insurance section 391 in which users may select whether they wish to purchase insurance and identify the type of insurance they wish to purchase. For example, section 391 includes a drop down menu 393 asking whether the user would like to purchase insurance. If the user responds by selection yes from menu 393, a list 395 of insurance plans is displayed. The list 395 of insurance plans displayed may be generated based on eligibility requirements. For example, a user might not qualify for some types of insurance if the reward is too great in value. Alternatively, eligibility for some insurance types may depend on the type of goal to be achieved. A description of each insurance plan is provided upon selection of details link 397 provided next to each of the insurance plans in list 395.

Once all of the goal parameters have been defined and desired options selected, the user may select submit option 398 to have the goal entered into the goal tracking system. Interface 300 may further include a clear option 399 to clear all of the fields. Additionally, interface 300 may provide a default option 303 that populates the fields and makes selections in interface 300 based on default settings or selections.

Figure 4:
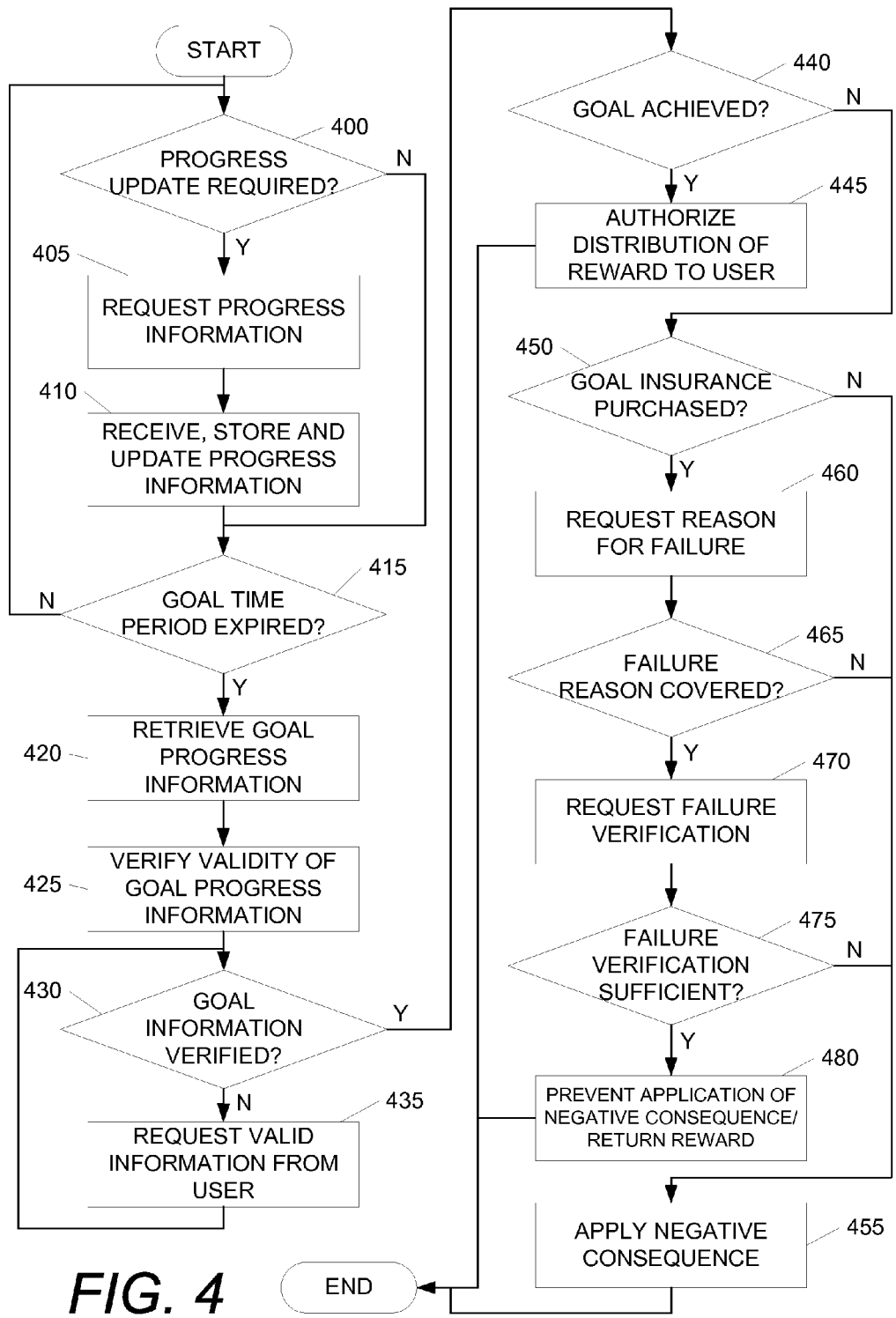
FIG. 4 illustrates an example method for processing a goal at the end of an allotted time period for achieving the goal according to one or more aspects described herein.

FIG. 4 illustrates an example method for processing a goal and associated rewards and negative consequences upon expiration of the goal achievement term. In step 400, a goal tracking system makes a determination as to whether a progress update is required. Progress updates may be required based on the user's specified update frequency. If a progress update is required, the goal tracking system requests progress information from the user in step 405. In step 410, the goal tracking system may receive and store the requested progress information as well as update the user's goal progress information. Updating the user's goal progress information may include updating one or more networked sites on which goal information is published and calculating various statistics and information such as a percentage of the goal completed, a projected finish date, whether the user is on track to finish the goal and the like.

Upon receiving the progress information or upon determining that a progress update is not required, the goal tracking system determines whether the goal achievement time period has expired in step 415. If the time period has not expired, the goal tracking system may return to monitoring and checking for progress updated in step 400. If, however, the time period has expired, the goal tracking system is configured to retrieve goal progress information from a data storage facility or from the user in step 420 to begin evaluating whether the user reached the goal. In step 425, the goal tracking system may optionally verify that the goal progress information is valid and has been received from a verified or trustworthy source. For example, if a user's goal is to run 5 miles in under 30 minutes, the goal tracking system may specify authorized locations or individuals for providing official results. If the goal progress information or a source thereof cannot be verified, as determined in step 430, the goal tracking system may provide the user with an opportunity to submit valid information in step 435. If, on the other hand, the information is valid, the goal tracking system determines whether the user has achieved the specified goal in step 440. This determination may be performed by comparing the goal progress data with the predefined goal. If the user has met his or her goal, the goal tracking system authorizes the distribution of the reward to the user in step 445. In one arrangement, a goal tracking system that is part of a financial institution may automatically distribute funds from a holding account to a user's bank account.

If, on the other hand, the user has not met his or her goal, the goal tracking system determines whether the user purchased goal insurance in step 450. If the user did not purchase goal insurance, the goal tracking system applies or authorizes application of the specified negative consequence in step 455. For example, the goal tracking system may authorize the financial institution to distribute funds held for a user's reward to one or more specified individuals. In one or more arrangements, donations by other sources may be returned to those sources instead of being distributed according to the negative consequence parameters. If, however, the user did purchase goal insurance, the goal tracking system requests that the user specify a reason for failing to reach the intended goal in step 460. In step 465, the goal tracking system determines whether the specified reason falls under the purchased goal insurance plan. If not, the goal tracking system may authorize the application of negative consequence as described in step 455.

If the reason for failure does fall under the plan, the goal tracking system may further request failure verification information in step 470. Failure verification information may include documentation to validate the reason the user failed to reach his or her goal. For example, if the user's reason for not meeting his or her goal was sickness, a medical doctor's note may be required. In another example, if the failure reason was unemployment, termination documentation or verification by the user's previous employer may be required. In step 475, the goal tracking system may determine whether the failure verification information is valid and sufficient. If so, the goal tracking system may prevent application of the negative consequence in step 480. If, however, the failure verification information is not sufficient or valid, the negative consequence may be applied in step 455.

Figure 5:
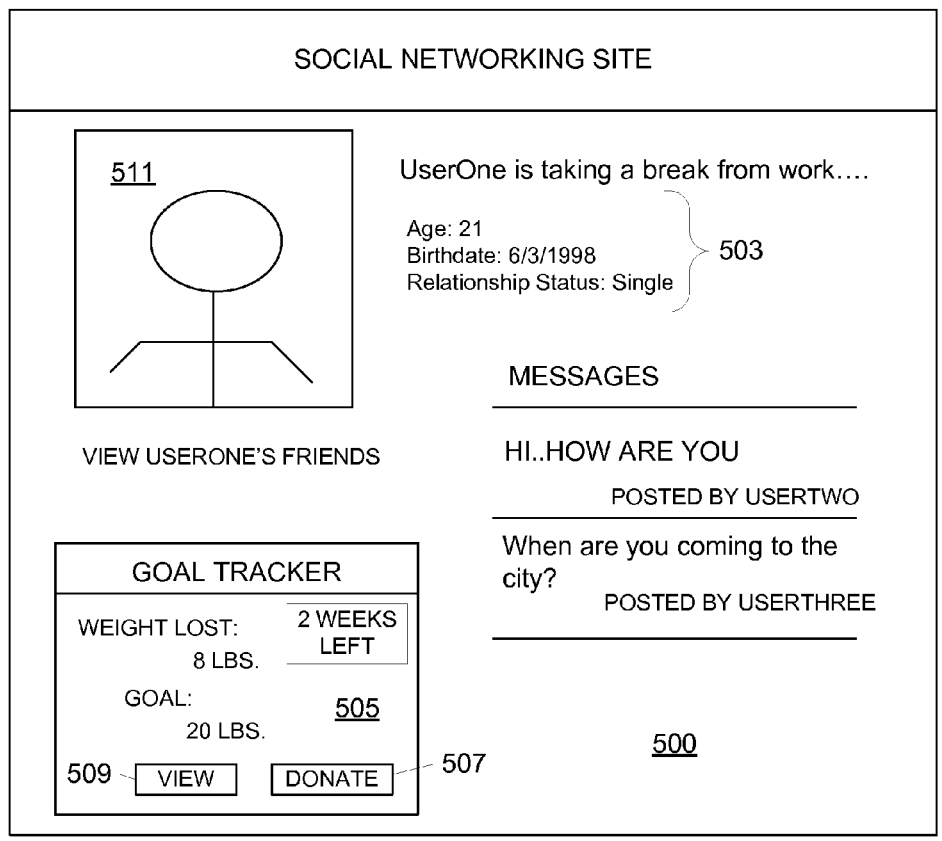
FIG. 5 illustrates an example network page in which a goal tracker is published according to one or more aspects described herein.

FIG. 5 illustrates a page in an example social network or community site on which goal information for a user is published. Page 500 includes biographical information 503 about the user such as a photograph 511, birthdate, gender, relationship status and interests. Page 500 further allows other users to publish comments, video, audio and other information. In order for another user to view, access, comment on or otherwise publish on page 500, the owner of page 500 may be required to authorize the other user. For example, authorization may be given by adding the other user as the page owner's friend or acquaintance. A goal tracker application or interface 505 is displayed on page 500 so that other users may track the user's progress and offer encouragement or motivation. In one example, interface 505 provides an option 507 to donate to a user's reward for achieving the specified goal. Additionally or alternatively, interface 505 includes a view option 509 that links users to another page and/or site containing additional details about the user and his or her specified goal. Interface 505 may use either a push or pull mechanism to obtain updated goal progress information from a goal tracking system. That is, interface 505 may periodically or aperiodically check for and download any new goal information. Alternatively, interface 505 may receive updated goal data automatically from the goal tracking system as the updates occur.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:
receiving, at a computing device of a financial institution, data relating to a user defined goal, wherein the user defined goal includes a negative consequence that is applied to a user for which the goal is set if the user does not meet the goal and a reward that is given to the user if the user meets the goal;
receiving, by the computing device, information identifying one or more funding sources from which a collection of funds is to be obtained for the goal, wherein the reward specifies a first action to be taken with the collection of funds and the negative consequence specifies a second action, different from the first action, to be taken with the collection of funds;
determining, by the computing device, whether the user defined goal has been met based on the received data;
in response to determining that the user defined goal has not been met, determining whether the user purchased goal insurance;
in response to determining that the user purchased goal insurance, determining whether one or more insurance qualification parameters have been met;
in response to determining that the one or more insurance qualification parameters have been met, preventing the negative consequence, including the second action to be taken with the collection of funds, from being applied; and
in response to determining that the one or more insurance qualification parameters have not been met or determining that the user did not purchase goal insurance, authorizing, by the computing device, application of the negative consequence including the second action.

2. The method of claim 1, wherein the reward and the negative consequence are monetary, wherein the goal and the negative consequence are both user-defined and wherein the one or more insurance qualification parameters are different from a failure to meet the user defined goal.

3. The method of claim 1, wherein the one or more funding sources include a plurality of entities other than the user and the financial institution.

4. The method of claim 1, wherein the first action of the reward includes distributing the collection of funds to the user.

5. The method of claim 1, wherein the second action of the negative consequence includes distributing the collection of funds to at least one third party other than the financial institution and the user.

6. The method of claim 1, wherein determining whether the one or more insurance qualification parameters have been met includes requesting verification that the one or more insurance qualification parameters have been met from a third party.

7. The method of claim 1, wherein the second action of the negative consequence includes distribution of a portion of the collection of funds to one or more entities other than the user, and wherein the method further comprises:
determining the portion of the collection of funds to be distributed in the second action based on an amount of goal progression.

8. The method of claim 1, wherein at least one of the one or more funding sources is the user and wherein preventing the second action of the negative consequence from being applied includes returning the portion of the amount of money to the user.

9. A method comprising:
receiving, at a computing device of a financial institution, data defining a goal to be achieved, the data including a negative consequence, a reward and information identifying one or more funding sources from which a collection of funds is to be obtained, wherein the reward specifies a first action to be taken with the collection of funds when the goal is met and the negative consequence specifies a second action, different from the first action, to be taken with the collection of funds when the goal is not met;
requesting, by the computing device, withdrawal of the collection of funds from the one or more funding sources, wherein the one or more funding sources includes at least one entity other than the financial institution;
determining, by the computing device, whether a user defining the goal wishes to purchase goal insurance, wherein the negative consequence is applied to the user when the goal is not met and the reward is given to the user when the goal is met; and
in response to determining that the user wishes to purchase goal insurance, storing the data along with a goal insurance indicator.

10. The method of claim 9, further comprising publishing, by the computing device of the financial institution, the goal on an on-line social networking site.

11. The method of claim 9, further comprising tracking user progress toward the goal on a specified schedule.

12. The method of claim 11, wherein tracking the user progress includes requesting progress information from the user.

13. The method of claim 9, wherein goal insurance includes one or more circumstances under which goal insurance is applicable.

14. The method of claim 9, wherein determining whether the user wishes to purchase goal insurance includes receiving a user selection of one or more circumstances under which the goal insurance is to be applicable.

15. The method of claim 14, further comprising determining a cost of the goal insurance based on the selection of the one or more circumstances.

16. An apparatus comprising:
a processor; and
memory storing computer readable instructions that, when executed, cause the apparatus to:
receive, data relating to a user defined goal for a user, the data including a negative consequence applied to the user, a reward for the user and information identifying one or more funding sources from which a collection of funds is to be obtained, wherein the reward specifies a first action to be taken with the collection of funds when the user achieves the goal and the negative consequence specifies a second action, different from the first action, to be taken with the collection of funds when the user does not achieve the goal;
determine, whether the user defined goal has been met based on the received data;
in response to determining that the user defined goal has not been met, determine whether the user purchased goal insurance;
in response to determining that the user purchased goal insurance, determine whether one or more insurance qualification parameters have been met;
in response to determining that the one or more insurance qualification parameters have been met, prevent the negative consequence, including the second action, from being applied; and
in response to determining that the one or more insurance qualification parameters have not been met or determining that the user did not purchase goal insurance, authorizing application of the negative consequence including the second action.

17. The apparatus of claim 16, wherein the first action includes distributing at least a portion of the collection of funds to the user in response to determining that the user defined goal has been met.

18. The apparatus of claim 16, wherein the second action of the negative consequence includes distributing the collection of funds to at least one third party other than a financial institution to which the apparatus corresponds and the user.

19. The apparatus of claim 16, wherein the computer readable instructions, when executed, further cause the apparatus to:
determine a portion of the collection of funds to be distributed in the second action based on an amount of goal progression, wherein the second action of the negative consequence includes distribution of the portion of the collection of funds to one or more entities other than the user.

20. The apparatus of claim 16, wherein determining whether the one or more insurance qualification parameters have been met includes requesting verification that the one or more insurance qualification parameters have been met from a third party.

21. An apparatus comprising:
a processor; and
memory storing computer readable instructions that, when executed, cause the apparatus to:
receive data defining a goal to be achieved, the data including a negative consequence, a reward and information identifying one or more funding sources from which a collection of funds is to be obtained, wherein the reward specifies a first action to be taken with the collection of funds when the goal is met and the negative consequence specifies a second action, different from the first action, to be taken with the collection of funds when the goal is not met;

request withdrawal of the collection of funds from the one or more funding sources, wherein the one or more funding sources includes at least one entity other than the financial institution;

determine whether a user defining the goal wishes to purchase goal insurance; and in response to determining that the user wishes to purchase goal insurance, store the data along with a goal insurance indicator.

22. The apparatus of claim 21, wherein goal insurance includes one or more circumstances under which goal insurance is applicable.

23. The apparatus of claim 21, wherein determining whether the user wishes to purchase goal insurance includes receiving a selection of one or more circumstances under which the goal insurance is to be applicable.

24. The apparatus of claim 23, wherein the computer readable instructions, when executed, further cause the apparatus to determine a cost of the goal insurance based on the selection of the one or more circumstances.

\* \* \* \* \*